US008793766B2

(12) United States Patent
Kundu et al.

(10) Patent No.: US 8,793,766 B2
(45) Date of Patent: Jul. 29, 2014

(54) METHOD AND APPARATUS FOR SECURITY-AWARE ELASTICITY OF APPLICATION AND SERVICES

(75) Inventors: Ashish Kundu, Hawthorne, NY (US); Ajay Mohindra, Hawthorne, NY (US); Sambit Sahu, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 13/419,037

(22) Filed: Mar. 13, 2012

(65) Prior Publication Data

US 2013/0247135 A1    Sep. 19, 2013

(51) Int. Cl.
*G06F 21/00*  (2013.01)
*H04L 29/06*  (2006.01)
*G06F 9/50*   (2006.01)

(52) U.S. Cl.
USPC .............................................. 726/3; 718/104

(58) Field of Classification Search
None
See application file for complete search history.

(56) References Cited

U.S. PATENT DOCUMENTS

| | | | |
|---|---|---|---|
| 6,263,435 B1 | 7/2001 | Dondeti et al. |
| 6,983,049 B2 | 1/2006 | Wee et al. |
| 6,990,202 B2 | 1/2006 | Wee et al. |
| 7,016,959 B2 | 3/2006 | Dinh et al. |
| 7,027,412 B2 | 4/2006 | Miyamoto et al. |
| 7,054,335 B2 | 5/2006 | Wee et al. |
| 7,184,548 B2 | 2/2007 | Wee et al. |
| 7,249,381 B2 | 7/2007 | Telesco |
| 7,310,809 B2 | 12/2007 | Peterka |
| 7,349,539 B2 | 3/2008 | Wee et al. |
| 7,363,491 B2 | 4/2008 | O'Connor |
| 7,400,731 B2 | 7/2008 | Lin |
| 7,463,735 B2 | 12/2008 | Wee et al. |
| 7,469,421 B2 | 12/2008 | Telesco |
| 7,490,351 B1 | 2/2009 | Caves et al. |
| 7,502,859 B2 | 3/2009 | Inoue et al. |
| 7,519,834 B1 | 4/2009 | Dondeti et al. |
| 7,526,658 B1 | 4/2009 | He et al. |
| RE40,708 E | 5/2009 | Dondeti et al. |
| 7,565,701 B2 | 7/2009 | Telesco |
| 7,571,463 B1 | 8/2009 | Fedyk et al. |
| 7,596,693 B1 | 9/2009 | Caves et al. |

(Continued)

OTHER PUBLICATIONS

International Search Report dated Apr. 23, 2013 in corresponding International Application No. PCT/US13/26635.

*Primary Examiner* — Gilberto Barron, Jr.
*Assistant Examiner* — Malcolm Cribbs
(74) *Attorney, Agent, or Firm* — Louis J. Percello, Esq.; F. Chau & Associates, LLC

(57) ABSTRACT

In a method for scaling up/down security (non-functional) components of an application, determine (a) types of interactions and a number of each type of interaction each non-security (functional) component has with security components for a plurality of requests. Determine, based on (a) and an expected number of incoming requests to the application, (b) types of requests to and interactions with the security components involving the non-security components and (c) a number of requests to and interactions with the security components involving non-security components for each type of request to the security components involving non-security components. Determine, for each security component, a capacity required for each type of request involving the non-security components and a capacity required for each type of interaction involving the non-security components. Change the capacities of the security components to new capacities, wherein the new capacities are based on (a), (c) and the determined capacities.

20 Claims, 6 Drawing Sheets

(56) References Cited

U.S. PATENT DOCUMENTS

| | | |
|---|---|---|
| 7,607,032 B1 | 10/2009 | Marek et al. |
| 7,636,860 B2 | 12/2009 | Ayars et al. |
| 7,644,445 B2 | 1/2010 | Zhu et al. |
| 7,657,450 B2 | 2/2010 | Amit et al. |
| 7,672,236 B1 | 3/2010 | Karunakaran et al. |
| 7,765,581 B1 | 7/2010 | Caronni et al. |
| 7,788,674 B1 | 8/2010 | Siegenfeld |
| 7,792,125 B2 | 9/2010 | Miyamoto et al. |
| 7,870,565 B2 | 1/2011 | Durham et al. |
| 7,904,720 B2 | 3/2011 | Smetters et al. |
| 8,007,468 B2 | 8/2011 | Miller |
| 8,010,768 B2 | 8/2011 | Chen et al. |
| 2004/0008724 A1 | 1/2004 | Devine et al. |
| 2007/0112574 A1 | 5/2007 | Greene |
| 2008/0046960 A1 | 2/2008 | Bade et al. |
| 2009/0228418 A1 | 9/2009 | Ramesh et al. |
| 2009/0235268 A1* | 9/2009 | Seidman et al. ............... 718/104 |
| 2011/0010755 A1 | 1/2011 | Virtanen |
| 2011/0126099 A1 | 5/2011 | Anderson et al. |
| 2011/0126207 A1 | 5/2011 | Wipfel et al. |
| 2012/0054771 A1 | 3/2012 | Krishnamurthy et al. |
| 2013/0174146 A1* | 7/2013 | Dasgupta et al. ................ 718/1 |

\* cited by examiner

METHOD AND APPARATUS FOR SECURITY-AWARE ELASTICITY OF APPLICATION AND SERVICES

BACKGROUND

1. Technical Field

The present invention relates to elastic cloud applications.

2. Discussion of the Related Art

Consider, for example, a scenario where an application hosted on a cloud (on one or more virtual machines) has a security component for user authentication and identity management. If the workload for the application increases because the application is elastic, a non-security component of the application may be allocated more capacity so the application can process more incoming requests. However, when the capacity for the security component is not increased in a proportionate manner this may cause a bottleneck. For example, user authentication requests may not be timely processed thereby affecting response time, service latency and throughput. Similar bottlenecks may also occur in other components such as those associated with monitoring, provenance data collection, etc.

The cloud, or more particularly, cloud computing may refer to the delivery of computing as a service rather than a product, whereby shared resources, software, and information are provided to computers and other devices as a metered service over a network (typically the internet).

BRIEF SUMMARY

The present invention discloses a method and apparatus to scale up and/or down the capacities of cloud security and/or non-functional components in proportion to an incoming load.

Exemplary embodiments of the present invention provide a method, system and computer program product for scaling up and/or down cloud security and/or non-functional components.

In the method, for each non-security component of an application, determine (a) types of interactions the non-security component has with security components of the application for a plurality of requests and a total number for each interaction type. Determine, based on (a) and an expected number of incoming requests to the application: (b) types of requests to the security components from the non-security components and types of interactions with the security components involving the non-security components; and (c) for each type of request to the security components from the non-security components, a total number of requests to the security components involving the non-security components and a total number of interactions with the security components involving the non-security components Determine, for each security component, a capacity required to process each type of request involving the non-security components and a capacity required to perform each of type of interaction involving the non-security components. Change the capacities of the security components to new capacities, wherein the new capacities are based on (a), (c) and the determined capacities.

DETAILED DESCRIPTION

In accordance with an exemplary embodiment of the present invention, there is provided a method and apparatus to scale up and/or down the capacities of cloud security and/or non-functional components in proportion to an incoming load. This scaling may be considered proactive.

In brief, the method is as follows. For a specific application, determine the number and types of interactions each component would make with the application's security components for each type of client request to the application. Determine the capacity required to process each such request at the component and the capacity required for each interaction of the component with the security components. Further, determine how the load on the security components increase/decrease according to the increase/decrease of the workload on the component. Then, when a capacity increase/decrease request comes in for the component, for the security components, somewhat proportionately increase/decrease their capabilities.

A typical cloud based application will now be described. For simplicity, the following focuses on security as an example of the non-functional components, unless otherwise mentioned.

Figure 1:
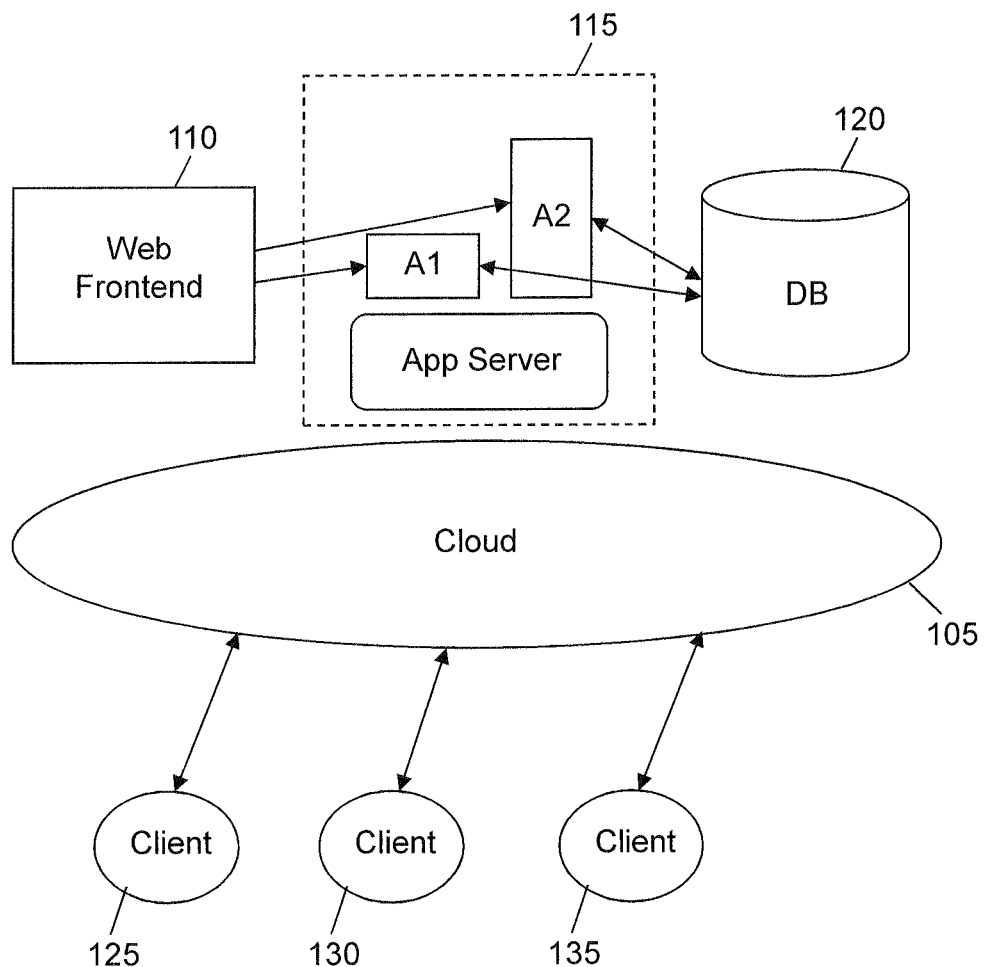
FIG. 1 illustrates an example of a cloud service.

Refer to FIG. 1. Consider an e-commerce website hosted on a cloud (105) such as IBM's Compute Cloud. The e-commerce website can be of the type buy.com or ebay.com, etc. In such a web-based system, there are three tiers: a front-end (e.g., Web Frontend 110), a middle-tier application layer 115 (e.g., App Server, A1 (e.g., a product browsing application deployed on top of App Server) and A2 (e.g., an online cart application deployed on top of App Server)) responsible for a customer's (e.g., Client 125, 130 and 135) browsing, selection and buying activity, and a third tier which is a database layer (e.g., DB 120).

A request from a customer such as client 125 may lead to the creation of a session after authentication of the client 125 if, for example, no session already exists for client 125 for the e-commerce application. Once the session is established, the front-end such as Web Frontend 110 provides a catalogue and/or a search user interface (UI) to the client 125 via hypertext markup language (HTML)/Java server pages (JSP)/active server pages (ASP)/Javascript, etc. The client 125 decides on a product to purchase and adds it to her cart. The client 125 proceeds to checkout. During checkout, the client 125: (a) checks the final price; (b) specifies the payment method—either (i) by using stored credit card information or (ii) by inputting credit card information; and (3) pays for the product and quits. The e-commerce application then stores the purchase order on the database such as DB 120, and forwards part of the purchase order to a delivery department, and an email to the client 125.

The steps above do not mention the security-related steps that are carried out during this process. The following is an example of the typical security-related steps that may be performed.

In creating the session with the client 125, several security steps may be involved. First, there is an authentication request to an identity management and an authentication subsystem.

Here, there are two sub-requests—one for identity verification, and the other for authentication of the client 125 for that specific time and for the requested activity and role. This may also involve certificate validation of a certified customer. Second, there is the generation of randoms and session keys for establishing a secure session, and loading the required security modules (such as an RSA/Elliptic curve). Third, there is a request to the secure session management system (such as one that implements Kerberos).

In checking out, there may be an access request to a secure database that stores credit card information. The secure session management system asks the client 125 to authenticate again using the password to assure that the client 125 is indeed an authorized one. Decryption of the credit card information is carried out.

There may also be an access request to store the received credit card information in the secure database, if the client 125 chooses so. Here, the secure session management system asks the client 125 to authenticate again using the password to assure that the customer is indeed an authorized one. This is often not required. Encryption of the credit card information is carried out.

In both access requests, a credit card verification request is sent to websites such as verifiedvisa.com or other databases.

The last security-related steps may involve encryption of the purchase order information, retrieval of encrypted client 125 e-mail from the secure database, and decryption of client 125 e-mail information.

Figure 2:
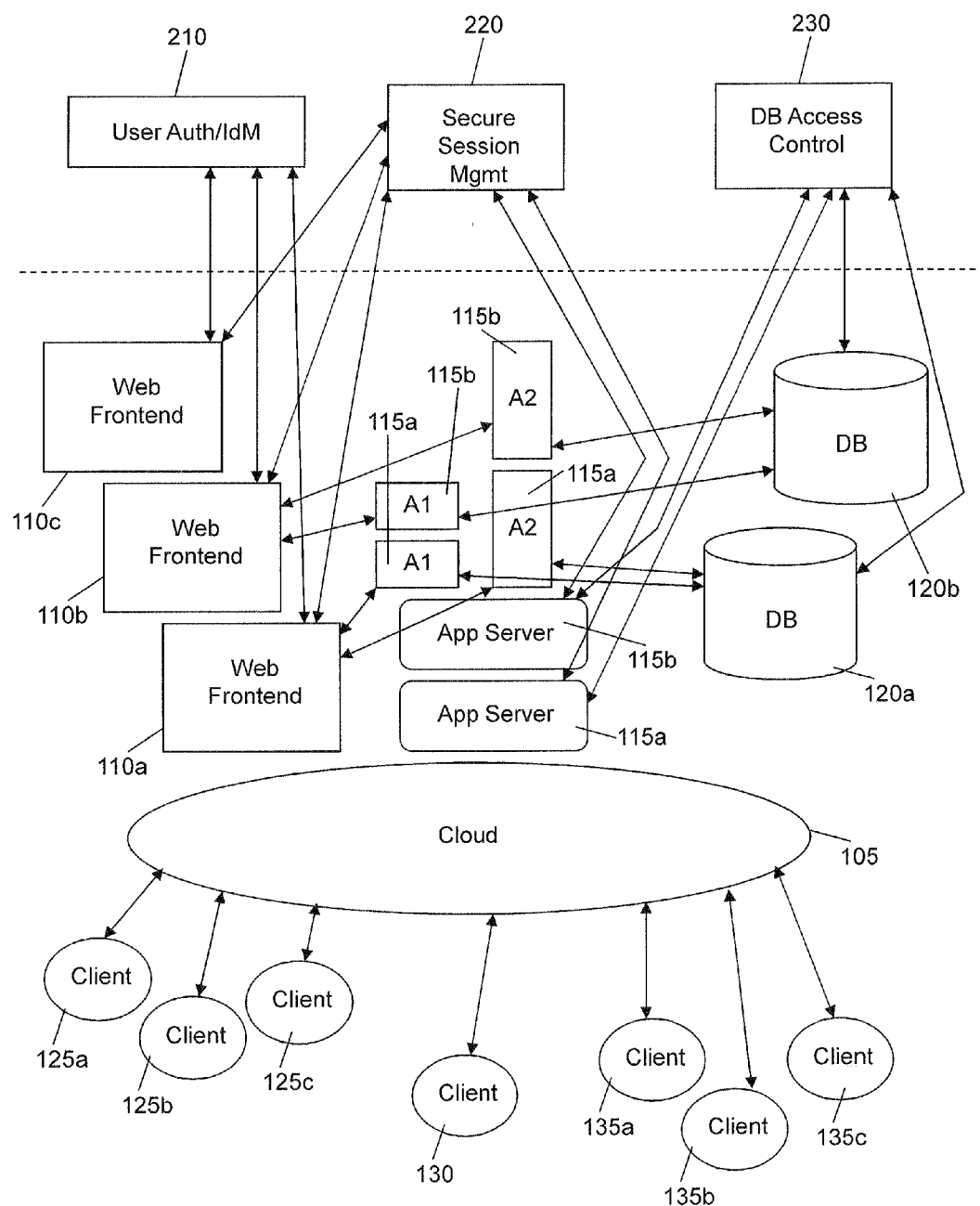
FIG. 2 illustrates an example of a scaled-up cloud service.
Figure 3:
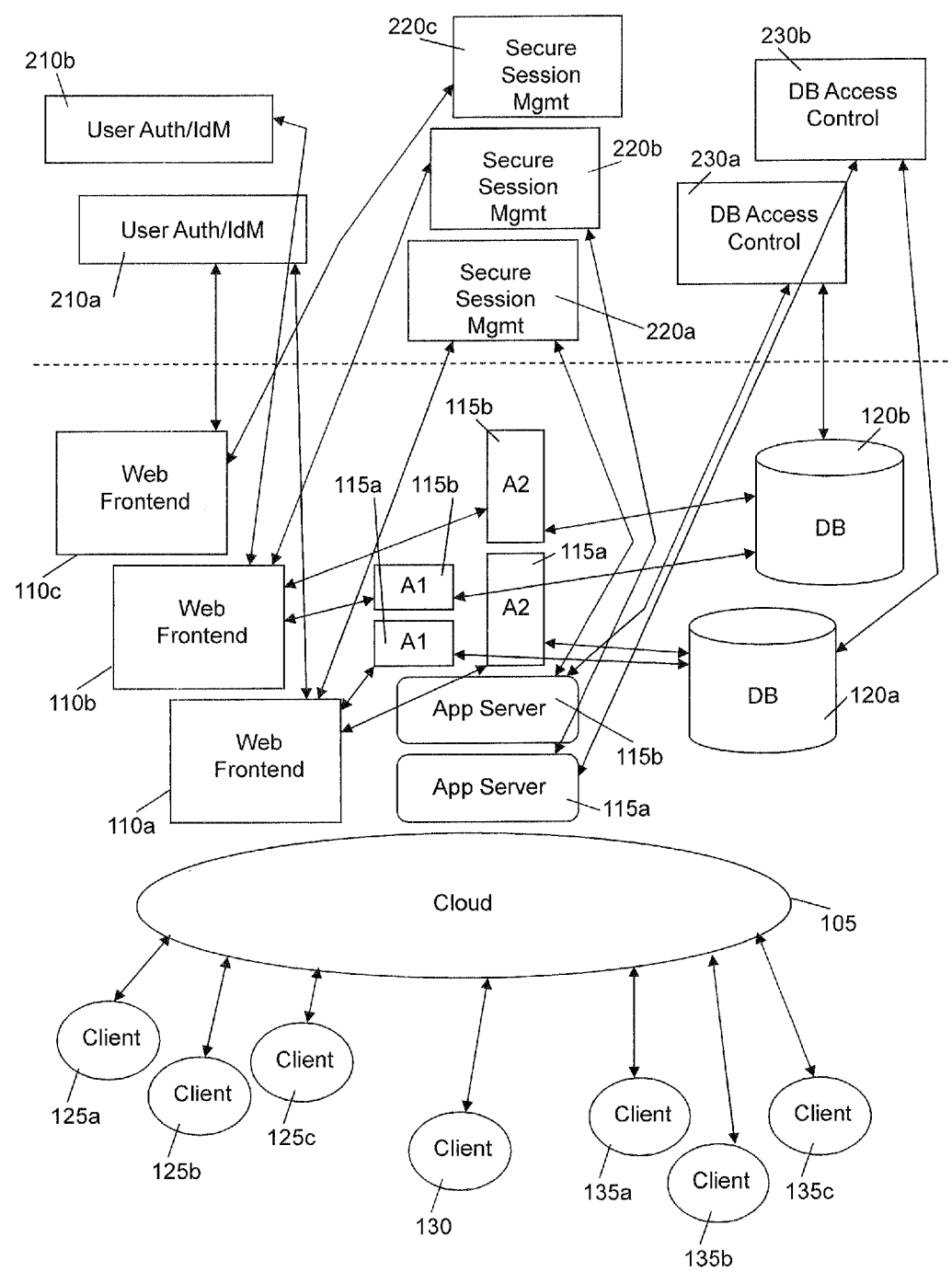
FIG. 3 illustrates a cloud service scaled-up according to an exemplary embodiment of the present invention.

Now, suppose during the Thanksgiving period, the e-commerce website experiences a higher incoming load. For example, as shown in FIG. 2, the number of clients increases. As a result, the management policy of the cloud-based application increases the capacity of all the tiers. For example, the capacity of the first-tier is tripled (with Web Frontends 110a-c), the capacity of the middle-tier application is doubled (with 115a and 115b) and the capacity of the third-tier is doubled (with DBs 120a and 120b). However, the capacity of the security components (e.g., user authentication/identity management (User Auth/IdM) 210, secure session management (Secure Session Mgmt) 220 and database access control (DB Access Control) 230) is not increased. As a result, the security component User Auth/IdM 210 could become a bottleneck due to the increasing load with no further amount of capacity available. Such a bottleneck can lead to denial of service attacks on the e-commerce website. As shown in FIG. 3, the present invention provides a way to increase the capacity of the security components to meet the incoming workload. The present invention also provides a way to decrease the capacity of security components when there is a drop in workload.

The present invention is applicable to components referred to hereinafter as functional and non-functional components, or functional and non-functional requirements/services. A security component may be considered a type of non-functional component, requirement or service. A non-security component may be considered a type of functional component, requirement or service.

As an example, a non-functional requirement associated with a functional requirement is something that is essential to provide/meet the expected/agreed upon: quality of service (e.g., response time, throughput, etc.), monitoring of service states, usage accounting and metering, security/privacy-protection of service (e.g., access, control, identity management, encryption, key management, integrity, trust management), provenance (e.g., meta-data collection), and compliance (e.g., making sure data is stored in a location and manner that is permitted within the law).

An example of a functional requirement corresponding to the quality of service non-functional requirement is providing an e-commerce service or a computing service. An example of a functional requirement corresponding to the monitoring of service states non-functional requirement is providing an e-commerce service or a computing service. An example of a functional requirement corresponding to the usage accounting and metering non-functional requirement is providing an e-commerce service or a computing service over the cloud. An example of a functional requirement corresponding to the security/privacy-protection of service non-functional requirement is providing an e-commerce service or a computing service over the cloud. An example of a functional requirement corresponding to the provenance non-functional requirement is providing an e-commerce service or a computing service over the cloud. An example of a functional requirement corresponding to the compliance non-functional requirement is providing an e-commerce service or a computing service over the cloud.

A more detailed description of the method for scaling up/down the capacities of non-functional (e.g., security) services is now provided. It is to be understood that in a typical distributed application, an interaction between a functional component FC and a security or a non-functional requirement (NFR) component NFRC may refer to a request from FC to NFRC or from NFRC to FC or a request from another component on behalf of FC/NFRC to NFRC/FC. In general, any interaction between FC and NFRC that leads to consumption of a non-negligible amount of resources of NFRC is considered in this invention.

Figure 4A:
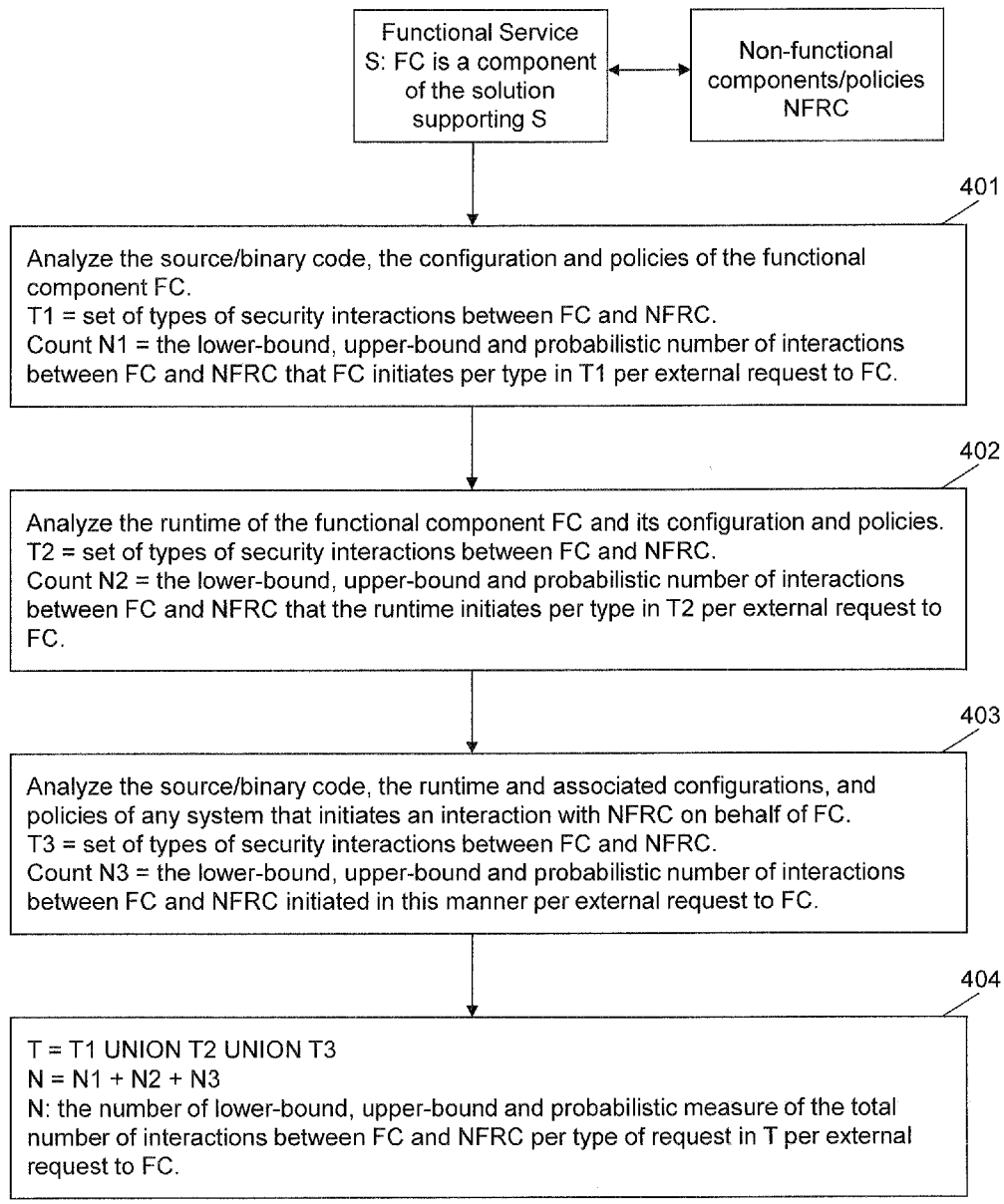
FIGS. 4A and 4B illustrate a flowchart of a method of scaling-up/down a cloud service according to an exemplary embodiment of the present invention.

Referring to FIG. 4A, a functional service S where FC is a component of the solution supporting S and non-functional components/policies NFRC are input. In response to the inputs, the source/binary code, the configuration and policies of the functional component FC are analyzed in 401. Here, T1 is determined. T1=set of types of security interactions between FC and NFRC. Then, N1 is counted. N1=the lower-bound, upper-bound and probabilistic number of interactions between FC and NFRC that FC initiates per type in T1 per external request to FC.

In 402, the runtime of the functional component FC and its configuration and policies are analyzed. Here, T2 is determined. T2=set of types of security interactions between FC and NFRC. Then N2 is counted. N2=the lower-bound, upper-bound and probabilistic number of interactions between FC and NFRC that the runtime initiates per type in T2 per external request to FC.

In 403, the source/binary code, the runtime and associated configurations, and policies of any system that initiates an interaction with NFRC on behalf of FC are analyzed. Here, T3 is determined. T3=set of types of security interactions between FC and NFRC. Then N3 is counted. N3=the lower-bound, upper-bound and probabilistic number of interactions between FC and NFRC initiated in this manner per external request to FC.

In 404, T and N are determined. T=T1 UNION T2 UNION T3. N=N1+N2+N3. N: the number of lower-bound, upper-bound and probabilistic measure of the total number of interactions between FC and NFRC per type of request in T per external request to FC.

Figure 4B:
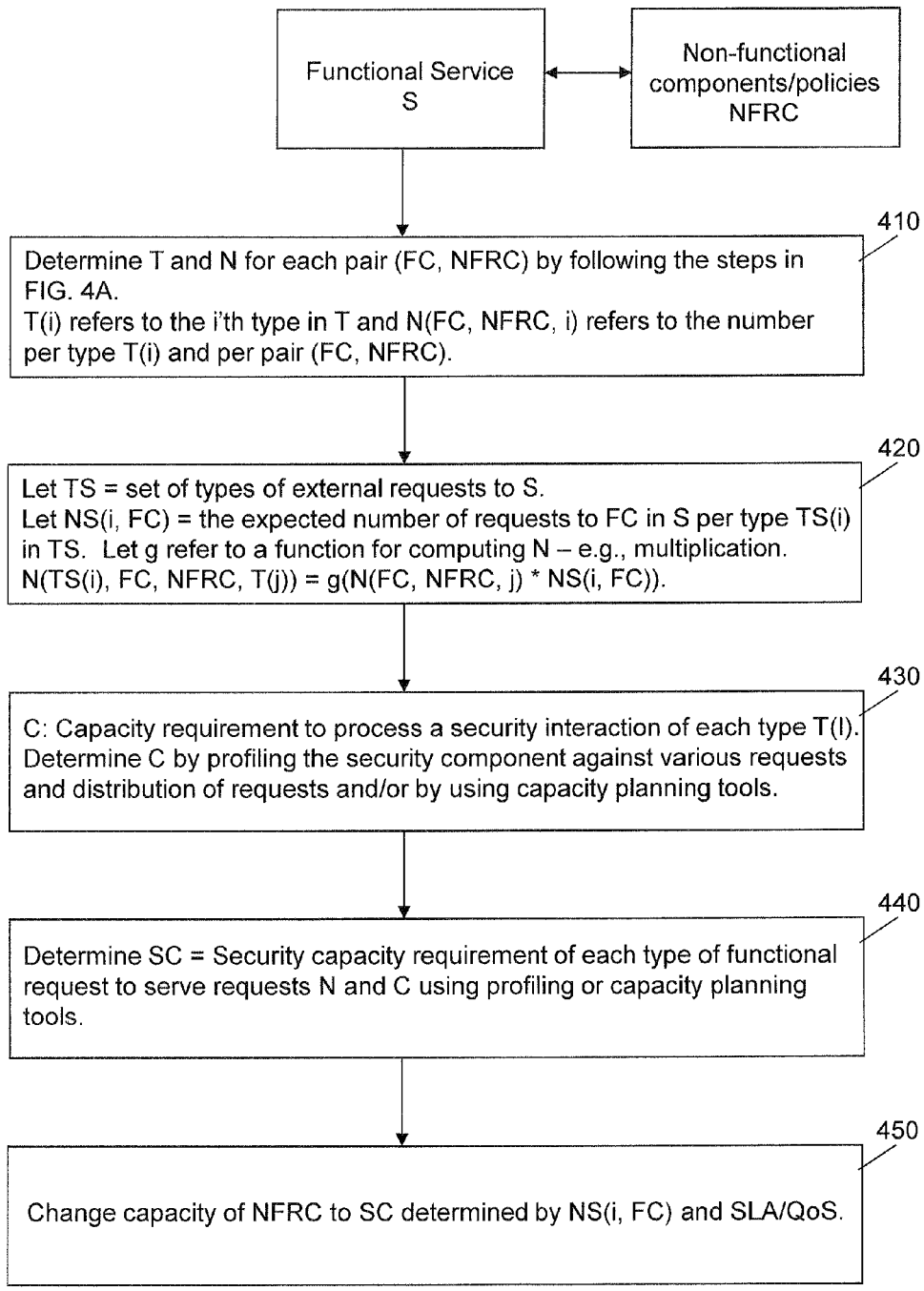

Turning now to FIG. 4B, the functional service S and non-functional components/policies NFRC are input. In response to the inputs, in 410, T and N for each pair (e.g., FC, NFRC) are determined by following the steps in FIG. 4A. T(i) refers to the i'th type in T and N(FC, NFRC, i) refers to the number per type T(i) and per pair (FC, NFRC). In other words, the method determines, for each non-security component of an application, (a) types of interactions the non-security component has with security components of the application for a plurality of requests and a total number for each interaction type. (a) may be determined by analyzing code of the security and non-security components, non-functional or functional subsystems associated with the application that interact with a security component or influence the load on at least one of the security components, configuration information of the security and non-security components, a workflow of the application and deployment parameters of the application.

In 420, let TS=set of types of external requests to S and NS(i, FC)=the expected number of requests to FC in S per type TS(i) in TS. Thus, N(TS(i), FC, NFRC, T(j))=N(FC, NFRC, j)*NS(i, FC). The method for computing N out of NS and component N's uses a function g that can be instantiated as a multiplication as shown. In other words, the method determines, based on (a) and an expected number of incoming requests to the application: (b) types of requests to the security components from the non-security components and types of interactions with the security components involving the non-security components; and (c) for each type of request to the security components from the non-security components, a total number of requests to the security components involving the non-security components and a total number of interactions with the security components involving the non-security components.

In 430, C is determined. C: Capacity requirement to process a security interaction of each type T(I). C is determined by profiling the security component against various requests and distribution of requests and/or by using capacity planning tools. In other words, the method determines, for each security component, a capacity required to process each type of request involving the non-security components and a capacity required to perform each type of interaction involving the non-security components.

A capacity required to process each type of request involving the non-security components may be determined by deploying a security component/system, sending different types of requests to that component and measuring the capacities used to serve the different types of requests. Another method is to do a modeling of the computations carried out by each such security component and the required network resources and computing resources, then use this to determine the capacity required to process each type of request. Another method may involve using a combination of the above two methods.

The capacity required to perform each type of interaction involving the non-security components and a security component may be determined by analyzing the capacities required to process each type of request involving the non-security components and a security component, the current load on the application, the expected load on the application due to the incoming requests, and service level agreement (SLA) and quality of service (QoS) parameters of the application.

In 440, SC is determined. SC: Security capacity requirement of each type of functional request to serve requests N and C using profiling or capacity planning tools. SC is determined by NS(i, FC) and SLA/QoS. In other words, the method determines, for each security component, a capacity required to process each type of request involving the non-security components and a capacity required to perform each of type of interaction involving the non-security components.

In 450, the capacities of the security components are changed to SC. In other words, the capacities of the security components are changed to new capacities, wherein the new capacities are based on (a), (c) and the determined capacities. Here, the total number of security components may be increased or decreased, or the internal capacities of the security components of capacities of the infrastructure and components on which the security components depend may be increased or decreased.

In the following embodiment, we describe how the scaling can be carried out as an exemplary method.

Variables N, C and SC, which are used to estimate a scaling factor for NFR services, are hereinafter described.

N: Number of security interactions per type of security interaction per functional request. This may be determined by analyzing a functional component, configuration/policies and runtime system. For example, let a functional request type-1 be 'add item to cart.' $N11=2$ for requesting keys from a key manager to encrypt the number of items and then decrypt the request, $N12=1$ for verifying secure session information. Let a functional request type-2 be 'check past orders.' $N21=1$ for requesting decryption of past orders.

C: Capacity requirement to process a security interaction of each type. This may be determined by analysis of protocols and dynamic profiling. For example, $C11=(5$ CPU, 10 RAM, 25 network bandwidth, 10 storage) for requesting keys.

SC: Security capacity requirement of each type of functional request. This may be determined using N and C and a relationship between a service level agreement (SLA)/quality of service (QoS), incoming load, current load and capacity of security services. For example, $SC1=w(N11*C11+N12*C12)$; w=weight as defined by/derived from SLA: Gold=1, Silver=0.5, Bronze=0.2. $N11*C11=(N11*5CPU, N11*10RAM, N11*25, N11*10)$. SC1 may also be computed as follows for another solution/SLA: $SC1=w11*N11*C11+w12*N12*C12$, where w11, w12 are the weights derived from SLA or other non-functional properties.

For a given functional service, the method proceeds as follows: (1) determine N and C per type T of security interaction per type of functional request; (2) let the expected number of incoming functional requests from clients be IL for a certain time window or until a specific event occurs, and (3) change security capacity to SC determined by IL and SLA/QoS per each security component supporting a specific security service.

For example, assume the following security interaction types={S1. authentication, S2. generate random/keys, S3. secure session, S4. secure access to database}. Also assume the following functional request types={F1. customer login, F2. product browsing, F3. add to carts}. Performing 1 through 3 using these security interaction types and functional request types results in the following.

1. Nij, Cj: i'th functional request and j'th security interaction that is essential for the functional request: $N11=2$, $N12=1, \ldots C12=(5$ CPU, 10 RAM, 25 network bandwidth, 10 storage).

2. Expected incoming functional requests from clients is $IL=(F1=100, F2=150, F3=75)$.

3. $SC1=w(F1*N11*C11, F1*N12*C12)$; w=weight as defined by SLA: Gold=1, Silver=0.5, Bronze=0.2. $N11*C11=(N11*5CPU, N11*10RAM, N11*25, N11*10)$.

4. Total SC computed from SC1, SC2, ... =(Capacity for component that serves S1: C1, capacity for all components that serve S2, ... ).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
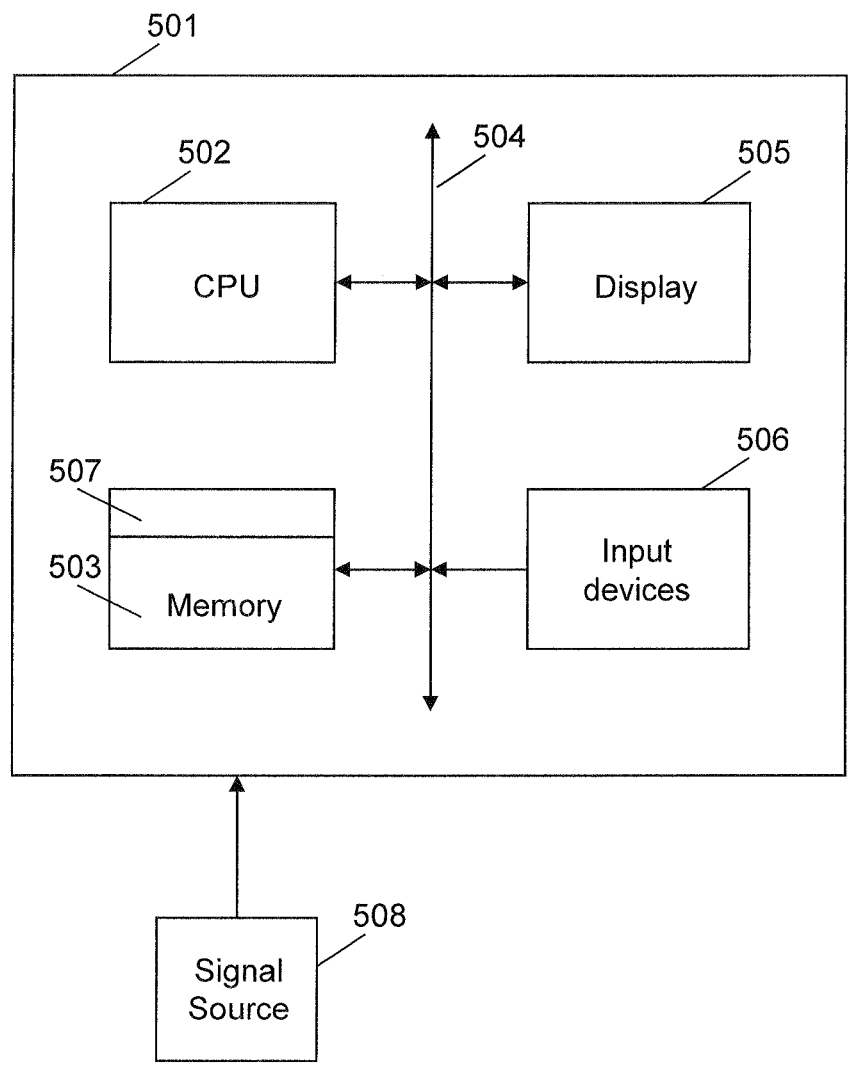
FIG. 5 illustrates an apparatus for implementing an exemplary embodiment of the present invention.

Referring now to FIG. 5, according to an exemplary embodiment of the present invention, a computer system 501 can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include RAM, ROM, disk drive, tape drive, etc., or a combination thereof. Exemplary embodiments of present invention may be implemented as a routine 507 stored in memory 503 (e.g., a non-transitory computer-readable storage medium) and executed by the CPU 502 to process the signal from the signal source 508. As such, the computer system 501 is a general-purpose computer system that becomes a specific purpose computer system when executing the routine 507 of the present invention.

The computer platform 501 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   determining, for each non-security component of an application, (a) types of interactions the non-security component has with security components of the application for a plurality of requests and a total number for each interaction type;
   determining, based on (a) and an expected number of incoming requests to the application: (b) types of requests to the security components from the non-security components and types of interactions with the security components involving the non-security components; and (c) for each type of request to the security components from the non-security components, a total number of requests to the security components involving the non-security components and a total number of interactions with the security components involving the non-security components;
   determining, for each security component, a capacity required to process each type of request involving the non-security components and a capacity required to perform each type of interaction involving the non-security components; and
   changing the capacities of the security components to new capacities, wherein the new capacities are based on (a), (c) and the determined capacities.

2. The method of claim 1, wherein (a) is determined by analyzing code of the security and non-security components, non-functional or functional subsystems associated with the application that interact with a security component or influence the load on at least one of the security components, configuration information of the security and non-security components, a workflow of the application and deployment parameters of the application.

3. The method of claim 1, wherein the capacity required to perform each type of interaction involving the non-security components and a security component is determined by analyzing the capacities required to process each type of request involving the non-security components and a security component, the current load on the application, the expected load on the application due to the incoming requests, and service level agreement (SLA) and quality of service (QoS) parameters of the application.

4. The method of claim 1, wherein the load on a specific security component is computed using SLA and QoS parameters of the application.

5. The method of claim 1, wherein changing the capacities of the security components to the new capacities includes increasing or decreasing the total number of security components.

6. The method of claim 1, wherein changing the capacities of the security components to the new capacities includes increasing or decreasing internal capacities of the security components or capacities of the infrastructure and components on which the security components depend.

7. A computer program product, comprising:
   a non-transitory computer readable storage medium having computer readable program code embodied therewith, the computer readable program code comprising:
   computer readable program code configured to determine, for each non-security component of an application, (a) types of interactions the non-security component has with security components of the application for a plurality of requests and a total number for each interaction type;
   computer readable program code configured to determine, based on (a) and an expected number of incoming requests to the application: (b) types of requests to the security components from the non-security components and types of interactions with the security components involving the non-security components; and (c) for each type of request to the security components from the non-security components, a total number of requests to the security components involving the non-security components and a total number of interactions with the security components involving the non-security components;
   computer readable program code configured to determine, for each security component, a capacity required to process each type of request involving the non-security components and a capacity required to perform each type of interaction involving the non-security components; and
   computer readable program code configured to change the capacities of the security components to new capacities, wherein the new capacities are based on (a), (c) and the determined capacities.

8. The computer program product of claim 7, wherein (a) is determined by analyzing code of the security and non-security components, non-functional or functional subsystems associated with the application that interact with a security component or influence the load on at least one of the security components, configuration information of the security and non-security components, a workflow of the application and deployment parameters of the application.

9. The computer program product of claim 7, wherein the capacity required to perform each type of interaction involving the non-security components and a security component is determined by analyzing the capacities required to process each type of request involving the non-security components and a security component, the current load on the application, the expected load on the application due to the incoming requests, and service level agreement (SLA) and quality of service (QoS) parameters of the application.

10. The computer program product of claim 7, wherein the load on a specific security component is computed using SLA and QoS parameters of the application.

11. The computer program product of claim 7, wherein the capacities of the security components are changed to the new capacities by increasing or decreasing the total number of security components.

12. The computer program product of claim 7, wherein changing the capacities of the security components to the new capacities includes increasing or decreasing internal capacities of the security components or capacities of the infrastructure and components on which the security components depend.

13. A system, comprising:
a memory device for storing a program; and
a processor in communication with the memory device, the processor operative with the program to:
determine, for each non-security component of an application, (a) types of interactions the non-security component has with security components of the application for a plurality of requests and a total number for each interaction type;
determine, based on (a) and an expected number of incoming requests to the application: (b) types of requests to the security components from the non-security components and types of interactions with the security components involving the non-security components; and (c) for each type of request to the security components from the non-security components, a total number of requests to the security components involving the non-security components and a total number of interactions with the security components involving the non-security components;
determine, for each security component, a capacity required to process each type of request involving the non-security components and a capacity required to perform each type of interaction involving the non-security components; and
change the capacities of the security components to new capacities, wherein the new capacities are based on (a), (c) and the determined capacities.

14. The system of claim 13, wherein (a) is determined by analyzing code of the security and non-security components, non-functional or functional subsystems associated with the application that interact with a security component or influence the load on at least one of the security components, configuration information of the security and non-security components, a workflow of the application and deployment parameters of the application.

15. The system of claim 13, wherein the capacity required to perform each type of interaction involving the non-security components and a security component is determined by analyzing the capacities required to process each type of request involving the non-security components and a security component, the current load on the application, the expected load on the application due to the incoming requests, and service level agreement (SLA) and quality of service (QoS) parameters of the application.

16. The system of claim 13, wherein the load on a specific security component is computed using SLA and QoS parameters of the application.

17. The system of claim 13, wherein the capacities of the security components are changed to the new capacities by increasing or decreasing the total number of security components.

18. The system of claim 13, wherein changing the capacities of the security components to the new capacities includes increasing or decreasing internal capacities of the security components or capacities of the infrastructure and components on which the security components depend.

19. A method, comprising:
determining, for each functional component of an application, (a) types of interactions the functional component has with non-functional components of the application for a plurality of requests and a total number for each interaction type;
determining, based on (a) and an expected number of incoming requests to the application: (b) types of requests to the non-functional components from the functional components and types of interactions with the non-functional components involving the functional components; and (c) for each type of request to the non-functional components from the functional components, a total number of requests to the non-functional components involving the functional components and a total number of interactions with the non-functional components involving the functional components;
determining, for each non-functional component, a capacity required to process each type of request involving the functional components and a capacity required to perform each type of interaction involving the functional components; and
changing the capacities of the non-functional components to new capacities, wherein the new capacities are based on (a), (c) and the determined capacities.

20. The method of claim 19, wherein a functional component includes a non-security component and a non-functional component includes a security component.

* * * * *